United States Patent [19]

Fulton et al.

[11] Patent Number: 4,879,352

[45] Date of Patent: Nov. 7, 1989

[54] ADDUCTS OF AN AMINOALCOHOL AND NITRILE RUBBER

[75] Inventors: Janet B. Fulton; Philip D. Edwards, both of Sarnia, Canada

[73] Assignee: Polysar Limited, Sarnia, Canada

[21] Appl. No.: 291,964

[22] Filed: Dec. 30, 1988

[51] Int. Cl.$^4$ ............................................... C08F 8/32
[52] U.S. Cl. .............................. 525/329.3; 525/370; 525/380
[58] Field of Search ...................... 525/329.3, 320, 380

[56] References Cited

U.S. PATENT DOCUMENTS

| | | | |
|---|---|---|---|
| 2,395,505 | 2/1946 | Sarbach | 525/329.3 |
| 2,435,853 | 2/1948 | Sutherland | 525/329.3 |
| 3,585,160 | 6/1971 | Miller et al. | |
| 3,730,951 | 5/1973 | Braude | 525/329.3 |
| 4,464,515 | 8/1984 | Rempel et al. | |
| 4,564,659 | 1/1986 | Kataoka et al. | 525/329.3 |
| 4,595,731 | 6/1986 | Wilkinson | 525/329.3 |
| 4,704,427 | 11/1987 | Kitahara et al. | 525/329.3 |

FOREIGN PATENT DOCUMENTS

| | | |
|---|---|---|
| 0146965 | 7/1985 | European Pat. Off. |
| 1558491 | 1/1980 | United Kingdom |

*Primary Examiner*—Joseph L. Schofer
*Assistant Examiner*—Bernard Lipman
*Attorney, Agent, or Firm*—Stevens, Davis, Miller & Mosher

[57] ABSTRACT

The present invention provides a method to prepare an adduct of a nitrile rubber and an amino alcohol. The present adducts have 2-oxazoline functionality which is detectable in the infrared spectrum.

10 Claims, No Drawings

ADDUCTS OF AN AMINOALCOHOL AND NITRILE RUBBER

FIELD OF THE INVENTION

This invention relates to a method to prepare an adduct of an aminoalcohol and a rubbery copolymer of a $C_{3-6}$ $\alpha,\beta$ unsaturated nitrile and a $C_{4-6}$ conjugated diene. The adducts prepared by the method of the present invention contain characteristic oxazoline functionality.

BACKGROUND OF THE INVENTION

Polymers having reactive 2-oxazoline functionality are described in U.S. Pat. No. 3,585,160.

More recently, blends of 2-oxazoline functionalized polymer with a second polymer having a functional group which reacts with oxazoline have been disclosed in published European patent application No. 146,965.

The 2-oxazoline functionalized polymers of the prior art have generally been prepared by polymerization. That is, such polymers have been prepared with the use of a monomer mixture containing at least one monomer having a vinyl 2-oxazoline functionality. A disadvantage of such polymer preparations is the requirement for the functionalized monomer.

Heretobefore, there has not been disclosed a method to prepare an adduct of an aminoalcohol and a nitrile rubber.

SUMMARY OF THE INVENTION

The present invention provides a method to prepare an adduct of
(a) an aminoalcohol of the formula

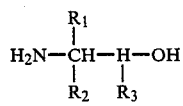

wherein $R_1$ is selected from H and methyl,
$R_2$ is selected from H and methyl,
$R_3$ is selected from H, a $C_{1-5}$ alkyl and aryl, and
(b) a rubbery copolymer of a $C_{3-5}$ $\alpha,\beta$ unsaturated nitrile and a $C_{4-6}$ conjugated diene, said method consisting essentially of
(i) providing a solution of said copolymer and said aminoalcohol,
(ii) adding to said solution a metal compound selected from zinc acetate and cadmium acetate, and
(iii) heating said solution to a temperature of from 100° to 180° C.

DETAILED DESCRIPTION

Rubber copolymers of a $C_{3-5}$ $\alpha,\beta$ unsaturated nitrile, for example acrylonitrile, and a $C_{4-6}$ conjugated diene, for example butadiene, are well known and are commonly referred to as "nitrile rubber". Nitrile rubber is widely commercially available and typically contains from 18 to 50 weight percent bound acrylonitrile (especially from 25 to 40 weight percent) and correspondingly to 100 weight percent, from 82 to 50 weight percent bound butadiene. Nitrile rubber is commercially available both as a low molecular weight liquid, and as a solid. Solid nitrile rubber having a Mooney viscosity ($ML_{1+4}$ at 100° C.) of from 25 to 120, especially from 35 to 85, is preferred for use in the method of the present invention. The polar characteristics of nitrile rubber makes it resistant to many hydrocarbon oils. However, nitrile rubber also contains diene unsaturation in the polymer chain, which causes the polymer to be somewhat susceptible to ageing via ozone attack or oxidative degradation. The ageing characteristics of nitrile rubber may be improved by the selective hydrogenation of the carbon-carbon double bonds in the polymer. As used herein, the term "selectively hydrogenated", means that the carbon-carbon double bonds are preferentially hydrogenated, with little or no reduction of the nitrile moiety. The selective hydrogenation of nitrile rubber is described in U.K. Pat. No. 1,558,491 and U.S. Pat. No. 4,464,515. When selectively hydrogenated nitrile rubber is employed in the method of the present invention, it is preferred that at least 80 mole percent, and especially from 90 to 99 mole percent of the carbon-carbon double bonds are saturated.

The method of the present invention, although completed in solution, is not restricted to the use of any specific solvent. However, as will be clearly understood by those skilled in the art, solvents which adversely undergo a reaction with the aminoalcohol should not be employed. Highly preferred solvents for use in the present method include benzene, monochlorobenzene and 1,2 dichlorobenzene.

The method of the present invention is preferably completed using a 1-12 percent nitrile rubber solution (weight/weight basis), especially between 5 and 10 percent.

The aminoalcohol used in the present method is defined by the formula:

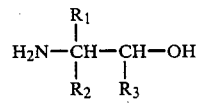

where $R_1$ is selected from H and methyl,
$R_2$ is selected from H and methyl, and
$R_3$ is selected from H, a $C_{1-5}$ alkyl and aryl.

Highly preferred aminoalcohols are ethanolamine and 2-amino-2-methylpropanol-1. The aminoalcohol is preferably used in an amount of between 1 and 5 times, especially from 2 to 3 times, the amount of bound nitrile contained in the nitrile rubber (molar basis).

The method of the present invention utilizes a metal compound selected from zinc acetate and cadmium acetate. The present method does not include the use of other metal compounds, such as zinc chloride, which persons skilled in the art might expect to be successfully substituted for zinc acetate or cadmium acetate, because our experimentation has shown that such other metal compounds do not always provide acceptable results.

The method of the present invention is undertaken at a temperature between 100° and 180° C., preferably from 125° to 140° C. A pressure above atmospheric may be required to attain such a temperature, depending upon the choice of solvent. The use of an essentially inert atmosphere (especially nitrogen) is preferred to provide any such pressure.

The adducts of the present invention may be conveniently analyzed using conventional spectroscopic techniques, such as Fourier transform infrared ("FTIR") and carbon 13 nuclear magnetic resonance ($^{13}C$ NMR) spectroscopy. FTIR analysis of the present adducts produces a spectrum having a characteristic absorbance peak in the vicinity of 1664 $cm^{-1}$ (i.e. at or near 1664 $cm^{-1}$), attributed to —N=C—O— functionality.

EXAMPLE 1

This example illustrates the preparation of an adduct of an aminoalcohol and a nitrile rubber according to the present invention.

The nitrile rubber used in this example was a commercially available acrylonitrile-butadiene copolymer sold under the tradename KRYNAC® 34.50 by Polysar Limited of Sarnia, Canada, having a bound acrylonitrile content of about 34 percent (with the balance to 100 percent comprising bound butadiene) and a Mooney viscosity ($ML_{1+4}$ at 100° C.) of about 50. Approximately 60 grams of this nitrile rubber was cut into small pieces and added to a screw-capped jar. A rubber solution was then prepared by adding 500 ml of 1,2 dichlorobenzene to the jar and shaking it until the rubber visually appeared to be essentially dissolved.

The reaction apparatus used in this and the following examples consisted of a 3 necked round bottom flask equipped with a Liebig-type condenser, a rubber septum and a mechanical agitator. The rubber solution (i.e. the aforedescribed 60 g of nitrile rubber in 500 ml of 1,2 dichlorobenzene) and 7.7 g of cadmium acetate were added to the apparatus. The apparatus was then lowered into an oil bath at a temperature of 130° C. and purged with nitrogen for 15 minutes. This was followed by the dropwise addition of 23.5 g of ethanolamine over a period of a few minutes. The flask was left in the oil bath at 130° C., with the agitator in operation, for 18 hours under a small positive nitrogen pressure.

The solution was cooled, and then worked up to recover the polymer as follows.

The solution was poured into a stirred beaker containing about 1 litre of methanol to coagulate the polymer. The polymer was then separated from the liquid, squeezed to remove some of the residual solvent and then dried in a vacuum oven at about 60° C.

The resulting adduct was analyzed by FTIR and $^{13}C$ NMR. The FTIR spectrum showed a peak at 1664 $cm^{-1}$, attributed to —N=C—O— functionality.

$^{13}C$ NMR analysis was completed at about 50 MHz (giving characteristic resonances at 54.0 ppm, attributed to =N—C—C— and at 67.0 ppm, attributed to —O—C—C—. A second $^{13}C$ NMR analysis was completed on a higher field instrument at about 126 MHz (giving characteristic resonances at 53.8 ppm, attributed to (=N—C—C—), at 66.6 ppm, attributed to (—O—C—C—) and at 169.0 ppm, attributed to (—N=C—O—) ).

EXAMPLE 2

The procedure as generally described in Example 1 was then repeated using 2-amino-2-methyl propanol-1 (34.3 g) instead of the ethanolamine.

The resulting adduct of the nitrile rubber and 2-amino-2-methyl-propanol-1 was analyzed by FTIR and $^{13}C$ NMR.

FTIR analysis showed a characteristic peak at 1663 $cm^{-1}$, attributed to (—N=C—O—).

The $^{13}C$ NMR (50 MHz) spectra showed characteristic resonances at 67.0 ppm (attributed to (—O—C—C—) ), 78.4 ppm (attributed to (=N—C—C—) ) and 167.2 ppm (attributed to (—N=C—O—) ).

EXAMPLE 3

The procedure as generally described in example 1 was repeated using zinc acetate instead of the cadmiu acetate used in example 1.

The FTIR spectrum of the resulting adduct showed a characteristic peak at 1664 $cm^{-1}$.

$^{13}C$ NMR analysis at about 50 MHz gave characteristic peaks at 54.0 ppm and 67.0 ppm.

EXAMPLE 4 (COMPARATIVE)

The procedure as generally described in example 1 was repeated using zinc chloride instead of the cadmium acetate used in example 1.

The FTIR spectra of the resulting product did not show any real absorption in the vicinity of 1663-1664 $cm^{-1}$, from which it can be concluded that the desired adduct of the nitrile rubber and ethanolamine was not produced.

EXAMPLE 5

This example illustrates the preparation of an adduct of a hydrogenated nitrile rubber and an aminoalcohol.

The hydrogenated nitrile rubber was prepared using a monochlorobenzene solution of an acrylonitrile butadiene rubber having a bound acrylonitrile content of about 38 percent (with the balance comprising bound butadiene) and a Mooney viscosity ($ML_{1+4}$ at 100° C.) of about 50. The rubber was hydrogenated in the presence of an hydrido rhodium tetrakis triphenyl phosphine catalyst (i.e. $HRh(PPh_3)_4$) and triphenylphosphine cocatalyst, according to a procedure generally described in U.S. Pat. No. 4,464,515. The resulting hydrogenated polymer was coagulated and dried. Infra red analysis of the hydrogenated polymer indicated that more than 99 percent of the carbon-carbon double bonds were hydrogenated, with little or no reduction of the nitrile functionality.

An adduct of the above selectively hydrogenated nitrile rubber was then prepared, using the procedure described in example 1 (using about 60 g of the hydrogenated nitrile rubber, 7.7 g cadmium acetate and 23.5 g ethanolamine).

The resulting adduct was analyzed by FTIR and found to have a characteristic peak at 1664 $cm^{-1}$, attributed to —N=C—O— functionality.

EXAMPLE 6

This example illustrates the preparation of an adduct of a partially hydrogenated nitrile rubber and ethanolamine, using monochlorobenzene as the reaction solvent.

100 ml of a 6 percent solution of a selectively hydrogenated nitrile rubber (having 38 percent bound acrylonitrile units, with greater than 99 mole percent of the carbon-carbon double bonds hydrogenated) was added to the reaction apparatus described in example 1, together with 0.86 g of cadmium acetate. The apparatus was then lowered into an oil bath at 120° C. and purged with nitrogen for 5 minutes. 7.87 g of ethanolamine was added to the solution by syringe, and the apparatus was left in the oil bath with the agitator operating at 120° C. under a positive nitrogen pressure for about 15 hours.

The adduct was worked up as generally described in example 1 and analyzed by FTIR.

FTIR analysis showed a characteristic peak at 1664 $cm^{-1}$, attributed to (—N=C—O—).

What is claimed is:

1. A method to prepare an adduct of
(a) an aminoalcohol of the formula

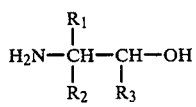

wherein $R_1$ is selected from H and methyl,
$R_2$ is selected from H and methyl,
$R_3$ is selected from H, a $C_{1-5}$ alkyl and aryl, and
(b) a rubbery copolymer of a $C_{3-5}$ $\alpha,\beta$ unsaturated nitrile and a $C_{4-6}$ conjugated diene, said method consisting of
  (i) providing a solution of said copolymer and said aminoalcohol,
  (ii) adding to said solution a metal compound selected from zinc acetate and cadmium acetate, and
  (iii) heating said solution to a temperature of from 100° to 180° C.

2. The method of claim 1 wherein said rubbery copolymer is selectively hydrogenated such that at least 80 mole percent of the carbon-carbon double bonds are saturated.

3. The method of claim 1 wherein said rubbery copolymer is acrylonitrile-butadiene rubber.

4. The method of claim 3 wherein said rubbery copolymer comprises from 18 to 50 weight percent bound acrylonitrile, and correspondingly to 100 weight percent, from 82 to 50 weight percent bound butadiene.

5. The method of claim 4 wherein said rubbery copolymer has a Mooney viscosity ($ML_{1+4}$ at 100° C.) of from 25 to 120.

6. The method of claim 1 wherein said aminoalcohol is selected from ethanolamine and 2-amino-2-methyl-propanol-1.

7. The method of claim 5 wherein said aminoalcohol is used in an amount between 2 and 5 times the amount of acrylonitrile contained in said rubber copolymer.

8. The adduct obtained by the method of claim 1.

9. The adduct of claim 8, wherein said adduct is characterized by producing an absorption peak in the vicinity of 1664 $cm^{-1}$ when analyzed by FTIR spectroscopy.

10. The adduct obtained by the method of claim 2.